United States Patent [19]

Isoyama

[11] 4,035,006
[45] July 12, 1977

[54] FLANGE CONNECTOR

[76] Inventor: Junji Isoyama, 18, 5-chome, Tamanawa, Kamakura, Kanagawa, Japan

[21] Appl. No.: 662,996

[22] Filed: Mar. 1, 1976

[30] Foreign Application Priority Data

Mar. 22, 1975 Japan .............................. 50-37232

[51] Int. Cl.² ......................................... F16L 17/02
[52] U.S. Cl. ................ 285/364; 285/379; 285/420
[58] Field of Search ............ 285/420, 406, 364, 38, 285/319, 24, 27, 379, DIG. 11

[56] References Cited

U.S. PATENT DOCUMENTS

| 180,781 | 8/1876 | Morgan | 285/406 X |
| 3,473,831 | 9/1969 | Schmitt | 285/364 X |

FOREIGN PATENT DOCUMENTS

| 471,667 | 2/1951 | Canada | 285/420 |
| 540,116 | 12/1931 | Germany | 285/364 |
| 1,177,103 | 9/1964 | Germany | 285/364 |

Primary Examiner—Dave W. Arola
Attorney, Agent, or Firm—Frank J. Jordan

[57] ABSTRACT

A flange connector adapted to connect flanges of pipes for use in the transportation of various substances, such as liquids, powdered substances, and other fluids is provided.

The flange connectors according to the present invention comprises a pair of first U-shaped holding members having resilient pipe alignment means and a second U-shaped holding member, such first and second members being arranged to be circumferentially spaced from each other by an angle of 120°. These three members are affixed to annular gasket interposed between the stationary and movable flanges of the pipes to be connected. By virtue of this construction the movable flange is brought into transverse or radial alignment with the fixed stationary flange.

7 Claims, 4 Drawing Figures

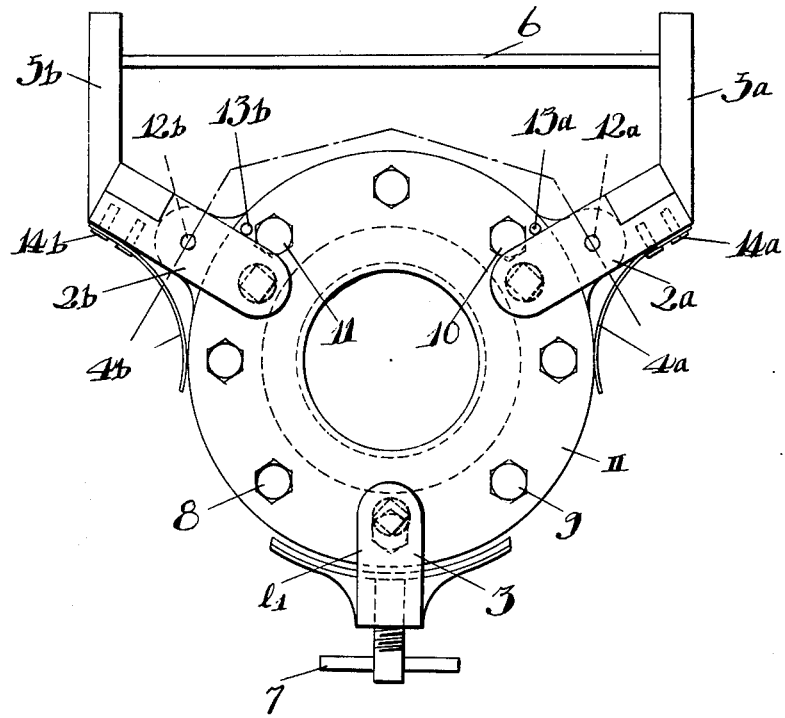

FLANGE CONNECTOR

BACKGROUND OF THE INVENTION

The present invention relates to a flange connector, and more particularly to flange connector adapted to connect flanged pipes simply and perfectly. The flange connector according to the present invention ensures the maintenance of a tight conncetion between the flanges and prevents fluid leakage whereby smooth transportation of the fluid substances by the pipes can be achieved.

Generally, the transportation of fluid substances has been by means of pipes connected to the loading lines from storage tanks of ships or vehicles which pipes and lines have had flanged connection at the junction points thereof. However, the flanges of these pipes, though specified as having the same nominal diameter, are actually different from one another according to working pressure, and since pipes of equal diameter are not always used for these loading lines the connection of such pipes has heretofore required much labor and skill. The present invention is intended to eliminate such drawbacks.

SUMMARY OF THE INVENTION

According to the present invention there are provided a pair of first U-shaped holding members and a third U-shaped holding member affixed in circumferentially spaced relation to an annular gasket interposed between the stationary and movable flanges of the pipes to be connected. Such U-shaped members are speced by an angle of 120° from one another, so that these members may act as a centering or alignment means whereby connection of the flanged pipes is made simply and perfectly.

Accordingly, one object of the present invention is to provide a flange connector adapted to connect flanged pipes used in the transportation of various fluid substances.

Another object of the present invention is to provide a flange connector of the character described comprising at least three circumferentially spaced holding members for centering or aligning pipe flangs.

A further object of the present invention is the provision of a flange connector which connects flanged pipes for the above use perfectly and economically and producing a tight connection therebetween.

BRIEF DESCRIPTION OF THE DRAWING

The present invention will now be explained in detail by way of example with reference to the accompanying drawing wherein:

FIG. 1 shows an end view of an embodiment of a flange connector according to the present invention;

FIG. 2 shown an elevational cross-sectional view of one of a pair of first U-shaped holding members used in the flange connector according to the present invention;

FIG. 3 shows an elevational view of the holding member as shown in FIG. 2; and

FIG. 4 shows a side sectional view of a third U-shaped holding member used in the flange connector according to the present invention.

DETAILED EXPLANATION OF THE INVENTION

Referring to FIGS. 1, 2 and 3, there are provided a pair of symmetrical first U-shaped holding members 2a and 2b which are mounted on the upper portion of an annular gasket 15 by means of pins 12a and 12b. The gasket is interposed between a movable flange I and a stationary flange II by and is affixed thereto 30 means of bolts 8, 9, 10 and 11. Further, resilient leaf springs 4a and 4b and second to the upper portions of the holding members 2a and 2b by means of screws 14a and 14b in such a manner that they will engage with the circumferential surface of the movable flange I. In addition, in order to control the transverse movement of the U-shaped holding members 2a and 2b limit stop elements 13a and 13b are provided on the outer face of the stationary flange II. Such stop elements thus serve to oppose the spring force or the leaf springs developed through contact with the circumferential surface of the movable flange I. Furthermore, the two holding members 2a and 2b may be provided, at the tops thereof respectively, with handle bars 5a and 5b such that when the bars 5a and 5b stand in an upright position the leaf springs 4a and 4b bend along, and in contact with, the circumferential surface of the movable flange I to thereby automatically prevent the flange I from moving out of position beyond the circumference of flange II. Both flanges are thus brought into alignments for connection. These bars 5a and 5b may be connected by a removable horizontal rod 6 which serves to prevent the holding members 2a and 2b from shifting under the influence of the leaf springs 4a and 4b. As will be apparent from FIG. 1 rod 6 will be disposed in a plane which is parallel to the horizontal axis of the flanges when such flanges are properly aligned.

Further, as seen in FIGS. 2 and 3, the leg portion $L_1$ of the holding member 2a which is to be positioned adjacent the movable flange has an aperture therein for receiving a clamping bolt 17 which is adapted to force the movable flange I toward the stationary flange II via gasket 15.

Referring to FIG. 4 a third U-shaped holding member 3 is arranged right beneath the lower circumferential surfaces of both movable and stationary flanges I and II spaced 120° circumferentially from either of the first holding members 2a and 2b, and is affixed to the lower portion of the gasket 15 by means of a bolt 20; Thus, leg $l_1$ and $l_2$ of the member 3 are positioned to clamp the movable and stationary flanges therebetween. Further, as in the case of the first holding members 2a and 2b one of legs $l_1$ of the member 3 which lies adjacent the movable flange I, has a side aperture for receiving a clamping bolt 19. The bottom portion 18 thereof is provided with a vertical aperture for receiving an adjusting bolt 7 adapted to adjust the vertical positioning of the movable flange I.

The inner portion of the gasket 15 may preferably be provided with a packing 16 of synthetic rubber having oil-proof, anti-abrasive, weather-proof and heat resistant properties. Further, in order to ascertain the centering or alignment conditions of the movable flange I a scale marking (not shown) may be provided on a suitable portion of the gasket 15 facing the movable flange I.

IN OPERATION, before clamping the movable and stationary flanges I and II the first and second U-shaped holding members 2a, 2b and 3, the clamping bolts 17a and 17b (not shown) of the first U-shaped holding members 2a and 2b, and the clamping bolt 19 of the third U-shaped holding member 3 are all loosened. Then, the movable flange I to be connected is inserted into the U-shaped holding member 3. The side surface of the movable flange I and that of the gasket 15 are joined together so that the resilient leaf springs 4a and 4b may act on the circumferential surface of the movable flange I to thereby limit the transverse or radial movements of the latter with respect to the stationary flange II; the adjusting bolt 7 is operated to center the movable flange I and, finally, the clamping bolts 17a, 17b (not shown) of the first holding members, and 19 of the third holding member are all tightened to finish the operation.

As stated above, the flange connector according to the present invention has the advantages that the connection of flanged pipes can be performed much more perfectly and simply than heretofore and that even the flanges of different nominal diameter can be connected without difficulty thus giving rise to a greater practical utility.

What is claimed is:

1. A flange connector for connecting the end flanges of a pair of pipes used in the transportation of selected fluid materials comprising:

a pair of first U-shaped holding members;

an annular gasket positioned between a stationary and a movable one of the pipe flanges;

said pair of U-shaped holding members being affixed in circumferentially spaced relation to the upper portion of said gasket, the bight portions of said U-shaped holding members extending in overlying relation to first circumferential surfaces of the flanges;

a third U-shaped holding member affixed to the lower portion of said gasket and to the stationary flange in circumferentially spaced relation to both of said first U-shaped holding members, the bight portion of said third U-shaped holding member extending in overlying relation to second circumferential surfaces of the flanges;

clamping means on each of said first pair of U-shaped holding members adapted to adjust the axial movements of the movable flange relative to the stationary flange;

resilient means on each of said first pair of U-shaped holding members adapted to control the radial movements of the movable flange relative to the stationary flange;

clamping means on said third U-shaped holding member adapted to clamp same to the movable flange;

and adjusting means carried by said third U-shaped holding member movable radially thereof to be selectively engageable with the stationary flange.

2. A flange connector as claimed in claim 1 wherein each said resilient means comprises a leaf spring adapted to engage with the circumferential surface of said movable flange to thereby limit the radial movements thereof with respect to said stationary flange.

3. A flange connector as claimed in claim 1 wherein the circumferential spacing between said pair of first holding members is 120°.

4. A flange connector as claimed in claim 1 wherein the circumferential spacing between said second holding member and either of said first holding members is 120°.

5. A flange connector as claimed in claim 1 wherein said stationary flange is provided with limit stop elements adapted to limit the radial movements of said pair of first holding members under the influence of said resilient means.

6. A flange connector as claimed in claim 2 wherein said first holding members are each provided with an upwardly extending bar at the top portion thereof, said bars being positionable parallel to the vertical faces of said stationary flange such that said leaf springs will be biased against the circumferential surface of said movable flange to thereby align said movable flange coaxially with the stationary flange.

7. A flange connector as claimed in claim 6 wherein said bars are connected by a removable horizontal rod.

* * * * *